Figure 1:
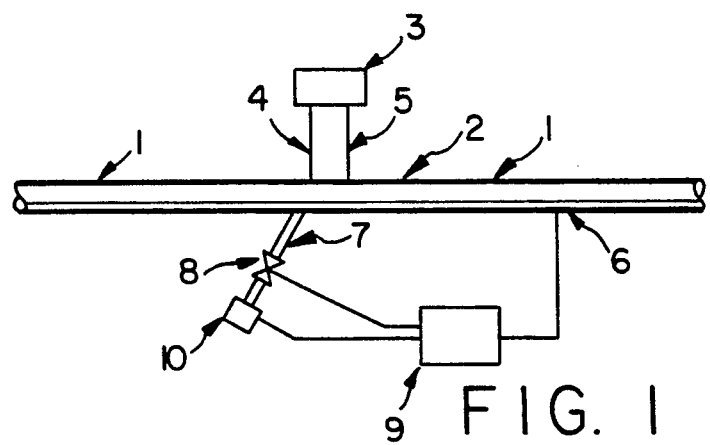

United States Patent [19]

Colletta et al.

[11] Patent Number: 5,199,257
[45] Date of Patent: Apr. 6, 1993

[54] DEVICE FOR REMOVAL OF PARTICULATES FROM EXHAUST AND FLUE GASES

[75] Inventors: Angelo Colletta; Giampaolo Giromella; Medardo Pinti, all of Rome, Italy

[73] Assignee: Centro Sviluppo Materiali S.p.A., Rome, Italy

[21] Appl. No.: 900,705

[22] Filed: May 20, 1992

Related U.S. Application Data

[62] Division of Ser. No. 468,148, Jan. 22, 1990, abandoned.

[30] Foreign Application Priority Data

Feb. 10, 1989 [IT] Italy .................. 47637 A89

[51] Int. Cl.⁵ .................................. F01N 3/02
[52] U.S. Cl. .......................... 60/275; 55/138; 55/151; 55/156; 60/303
[58] Field of Search ............ 60/275, 303; 55/138, 55/151, 156, DIG. 30

[56] References Cited

U.S. PATENT DOCUMENTS

| | | |
|---|---|---|
| 2,771,736 | 11/1956 | McKinley . |
| 2,989,144 | 6/1961 | Styrie .................... 60/275 |
| 3,398,685 | 8/1968 | Stuetzer ................ 55/151 |
| 3,524,316 | 8/1970 | McKee . |
| 3,979,193 | 9/1976 | Sikich .................... 60/275 |
| 4,038,049 | 7/1977 | Melcher ................ 55/138 |
| 4,216,653 | 8/1980 | Nakase et al. . |
| 4,299,190 | 10/1980 | Andoniev et al. . |
| 4,355,504 | 10/1982 | Liu et al. . |
| 4,376,637 | 3/1983 | Yang . |
| 4,441,971 | 4/1984 | Ishiguro et al. . |
| 4,571,938 | 2/1986 | Sakurai . |
| 4,587,808 | 5/1986 | Watanabe et al. . |
| 4,604,868 | 8/1986 | Nomoto et al. . |
| 4,622,810 | 11/1986 | Shinsei et al. . |
| 4,741,746 | 5/1988 | Chao et al. . |
| 4,798,049 | 1/1989 | Mayer . |
| 4,922,714 | 5/1990 | Grob et al. . |

FOREIGN PATENT DOCUMENTS

| | | |
|---|---|---|
| 0114696 | 6/1984 | European Pat. Off. . |
| 0283240 | 9/1988 | European Pat. Off. . |
| 56-12011 | 2/1981 | Japan . |
| 63-232817 | 9/1988 | Japan . |
| 272911 | 11/1988 | Japan .................... 60/275 |
| 1329840 | 9/1973 | United Kingdom . |
| 1535500 | 9/1978 | United Kingdom . |

*Primary Examiner*—Douglas Hart
*Attorney, Agent, or Firm*—Young & Thompson

[57] ABSTRACT

Device for reduction of exhaust gas particulates in an exhaust pipe, comprising in combination a two-pole high-voltage generator, and a plurality of conductors alternately connected to one or the other of the poles. The conductors constitute substantially the only obstruction to flow of exhaust gas through the pipe and occupy a total area which is less than 50% and more than 10% of the pipe cross section. Air is introduced into the pipe upstream of the conductors, and a probe analyzes the downstream gas and regulates the air introduction according to the detected composition.

1 Claim, 1 Drawing Sheet

DEVICE FOR REMOVAL OF PARTICULATES FROM EXHAUST AND FLUE GASES

This application is a division of application Ser. No. 07/468,148, filed Jan. 22, 1990, abandoned.

SUMMARY

During the combustion of carbon-rich substances there is often abundant emission of carbon particles, (particulates), due to shortage of air in the mixture burnt or even to poor mixing.

According to the invention, particulates are removed by a system of conductors between which a high potential difference is established. When the carbon particles pass between these conductors they cause a discharge which renders them incandescent and they are burnt up.

DESCRIPTION

This invention concerns a device for stripping particulates from exhaust and flue gases. More precisely it concerns a system for eliminating or at least greatly decreasing the emission of particulates from diesel engine exhausts or from flue gases resulting from all those applications involving the burning of gas oil or heavier oils, even in mixes with aromatic fractions (heating plants, portable power generators, large power stations, etc.) or coal.

Although, for simplicity, reference is made principally to diesel engines in the remainder of the description, it is obvious that the points put forward and the conclusions reached refer to and hold good equally for the other applications.

Combustion of hydrocarbons, starting from molecules with about ten carbon atoms or simple aromatic molecules, gives rise not only to the usual products of combustion such as $CO$, $CO_2$ and $H_2O$, but also to products such as unburnt organic compounds, soot and nitrogen oxides. The same holds good for the combustion of coal, at least as far as soot is concerned.

The composition of exhaust gas can vary considerably, depending on the quantity of air used for combustion. However, for a good process yield (e.g. to obtain sufficient power) the air-fuel ratio is fixed at around certain values which makes it difficult to avoid the emission of particulates.

The phenomenon is particularly evident to the observer in the case of automotive diesel engines, which are thus accused of causing heavy pollution and of seriously harming public health.

Generally speaking, these accusations are groundless. In fact, compared with gasoline engines, diesels emit from four to six times less carbon monoxide (which is a powerful poison since it blocks the blood-oxygen exchange), about half the amount of unburnt hydrocarbons (which are highly carcinorenic) and around half the nitrogen oxides (which are among those responsible for acid rain). However, diesel engines emit some forty times more carbon particles (which in the long term can cause bronchitis and other chest complaints), as well as sulphur oxides (also responsible for acid rain, but which could be eliminated if the diesel fuel were desulphurized, as is done with gasoline).

It should also be observed that soot adsorbs unburnt hydrocarbons and hence acts as a vector for these carcinogenic agents.

To sum up, there can be no doubt that the soot emitted by the combustion of gas oil, fuel oil and the like is extremely unpleasant and that such emissions should thus be eliminated or at least greatly reduced.

Some decrease in the particulates caused by the combustion or hydrocarbons can be achieved by adjusting the combustion by electronic means. However, this adjustment will only reduce the particulates by about 20%, which is not sufficient for a wide of applications. Many efforts have thus been made to resolve this problem.

Numerous patents (e.g. J63-232817, EP 283240 and 114696, U.S. Pat. Nos. 4,622,810; 4,604,868; and 4,571,938, etc.) use ceramic filters of various descriptions which mechanically trap the particulates and are periodically regenerated, for instance by combustion utilizing hot gases produced by a special burner or by a stream of preheated air. The filter is often also impregnated with a catalyst, usually platinum, to facilitate combustion.

In this manner the particulates is greatly reduced. However, the complexity of the solutions adopted to date, the cost and fragility of the ceramic filters, and the cost and deterioration of the catalysts (due to poisoning, for instance) have so far rendered the use of such filters uneconomic, especially for vehicles.

U.S. Pat. No. 4,741,746 suggests the use of an electrostatic precipitator with corona effect to precipitate the carbon particles from diwsel exhaust gases.

U.S. Pat. No. 4,587,808, also concerning diesel engines, provides for the use of a molecular dissociator which, with a charge of up to 150 kV, causes dissociation of the $CO$, $CO_2$ and $NO_x$ molecules and unburnt hydrocarbons into the constituent chemical elements, and the subsequent removal of the carbon particles thus produced, as well as of those already present in the exhaust gas, by means of an electrostatic separator and a cyclone.

At the 1987 Paris Meeting on Air Pollution Caused by Transport, it was reported, however, that when industrially-derived systems are installed in cars, their efficiency is dubious (as in the case of cyclones) or their size is excessive and their complexity prohibitive (electrostatic separators), (cf. Pollution Atmospherique, Special Number, December 1987, pp 268–285).

It is evident from the foregoing that in the case of applications of limited size (such as automotive diesel engines etc. or domestic heating plants) the technical and economic problems bound up with reduction of the particulate content of gases resulting from the combustion of hydrocarbons are far from being resolved.

The objective of this invention is to eliminate the drawbacks inherent in existing particulate stripping systems by providing a simple, inexpensive, compact device for the reduction of particulate emissions in gases resulting from the combustion of hydrocarbons.

According to this invention, a particulate removal device characterized by the combination of the following parts, is introduced into an exhaust pipe through which flow the products of combustion of hydrocarbons:

Two-pole high-voltage generator
Several conductors connected alternately to one or other of the poles
Means for introducing air into said pipe upstream of said conductors
Means for regulating said means for introducing air.

Said conductors each consists of a conductive metal grid inside said pipe set perpendicular to the general direction of flow of said exhaust gases.

The size of the grid (or the percentage ratio of the total cross-sectional area of the filaments forming the grid to the cross-section of the pipe) must be less than 50% and preferably less than 35%, but more than 10%/

These values are dictated by the need for a good balance between the necessity of not unduly obstructing the cross-section of the pipe, while having an adequate area covered by the electric discharge.

Alternatively, said conductors can consist of grids and/or plates, and/or wires, arranged to form flats or tubes parallel to the general direction of flow of said exhaust gases.

In this case the space occupied by said conductors, as defined above, can be less than 35% and more than 4%, while the grid and/or plates and/or wires can run parallel to the axis of said pipe for a length up to ten times the pipe diameter. In both these versions, said conductors can have points protruding at right angles from their surface.

The voltage supply to the conductors must be such as to provide an electric field between 50 and 98% of that which would cause a discharge in the gas at the operating temperature and under the relevant working conditions.

Said means for introducing air into said pipe consist of a valved conduit or line and a pipe.

Said means for controlling the means for introducing air consist of a probe which analyses the exhaust gas and transmits the results to a microprocessor which controls the pump and the valve for introducing the desired quantity of air into the pipe upstream of said conductors.

The present invention will now be described in greater detail by reference to the accompanying drawing which illustrates it purely by way of example, while in no way limiting the aims and scope of the invention:

FIG. 1 indicates the general schematic layout

Figure 2:
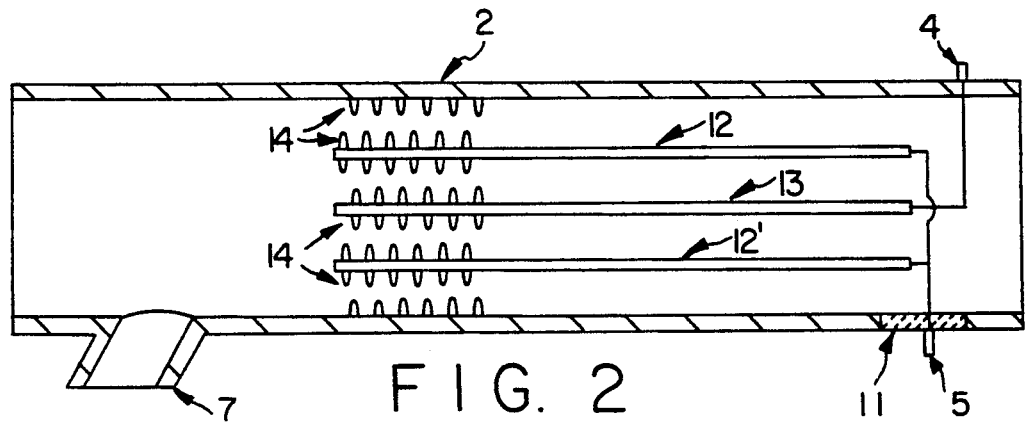
Figure 3:
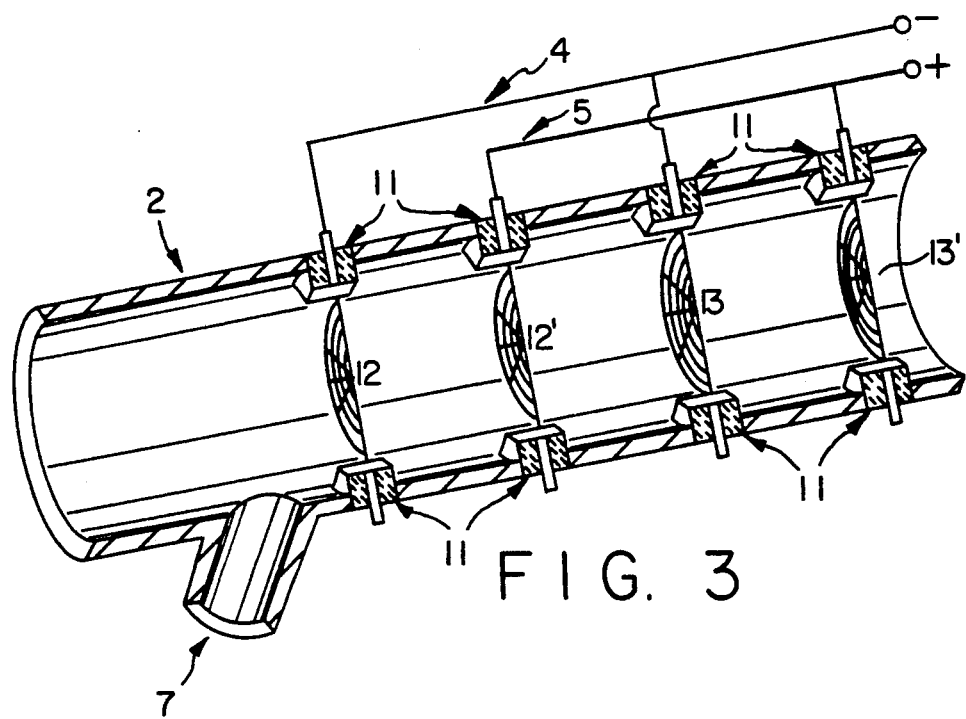

FIG. 2 provides a sectional view of an embodiment in which the conductors are set parallel to the general direction of gas flow FIG. 3 is a sectional perspective view of an embodiment in which the conductors are set perpendicular to the general direction of gas flow.

With reference to FIG. 1, a conduit is introduced into a pipe 1 carrying exhaust gas. Said conduit is complete with conductors (not shown) connected via cables 4 and 5 to voltage generator 3. A microprocessor 9 processes the signals concerning the composition of the gas analysed by probe 6 and controls valve 8 on line 7 connected to conduit 2, to admit into the latter the desired quantity of air, which is fed via pump 10.

In operation, probe 6 analyses the gas, especially as regards its $CO$, $CO_2$ and $O_2$ content. The signals are sent to the microprocessor 9 which—on the basis of pre-established programs and other information regarding specific fuel consumption—establishes the quantity of unburnt material and soot and hence the amount of air needed for their combustion and, consequently, controls pump 10 and valve 8.

At the same time, a high voltage is established between the conductors, through voltage generator 3.

When the gas flows between the electrodes, the soot contained therein lowers the dielectric constant of the system, causing a strong spark to be discharged onto the carbon particles, rendering them incandescent, so they are burnt up.

Enrichment of the gas with air and the high temperature attained permit most of the carbon particles to be burnt, while ensuring the production essentially of carbon dioxide. In this way, for example, the very low carbon monoxide content of diesel engine exhaust gases is maintained and, in some cases, even decreased.

Two embodiments of the invention are illustrated in FIGS. 2 and 3.

In FIG. 2, the conductors, in the form of flat plates 12, 12' and 13, are set parallel to the general direction of flow of the gas, from left to right; cables 4 and 5 respectively feed plates 12, 12' and 13, cable 5 passing through the wall of conduit 2 via insulated section 11. The plates can have protruding points 14 to assist the formation of electric discharges between the carbon particles and the plates themselves.

In FIG. 3, the conductors, in the form of circular grids 12, 12', 13 and 13', are set perpendicular to the general direction of gas flow, being fed via cables 4 and 5, while being kept insulated by insulators 11 which also permit the passage of cables 4 and 5 through the wall of conduit 2.

Of course, other shapes and arrangements of conductors 12 and 14 can be employed without any loss of the protection offered by the invention.

The present invention has been tested on the exhaust system of a diesel-electric set with a 3860 cc engine and a generator rated at 40 kV at 1500 rpm. The engine was run at 1400 rpm during the tests.

The conductors, in the form of a grid, as in FIG. 3, were set 3 cm apart. The diameter of the four pairs of conductors was 20% less than the internal diameter of the exhaust pipe. The voltage between the conductors of a pair of conductors ranged from 50 to 65 kV. The amount of space occupied transversely by each grid, as defined above, amounted to 22% of the cross-sectional areas of the pipe.

The engine was run for one hour during each test and the particulate removal device was operated for fixed periods. At the same time, the exhaust gas was sampled and the sample was passed through a weighed filter. After the passage of one cubic meter of gas the filter, with its particulate load, was reweighed.

The average quantity of particulates contained in the exhaust gas which was not treated as per this invention was 17.2 $mg/m^3$, the variability being between $-3$ and $+4$ $mg/m^3$.

Insertion of the pairs of grids one by one resulted in a decrease in the particulate content of the treated gas, varying from about 15% (in the case of one pair of grids with voltage of 52 kV) to about 70% (with four pairs of grids and voltage of 60 kV).

We claim:

1. In a device for reduction of exhaust gas particulates in an exhaust pipe, comprising in combination a two-pole high-voltage generator, a plurality of conductors alternately connected to one or the other of said poles, said conductors constituting substantially the only obstruction to flow of exhaust gas through said pipe and occupying a total area which is less than 50% and more than 10% of the internal cross section of the pipe, said connectors each consisting of a conductive metal grid arranged inside said pipe perpendicular to the general direction of flow of said exhaust gases, and means for introducing air into said pipe upstream of said conductors; the improvement wherein each said conductive metal grid is of spiderweb configuration consisting of a plurality of radially extending wires supporting and spacing apart a plurality of concentric circular wires.

* * * * *